United States Patent
Uejima

(10) Patent No.: US 11,303,364 B2
(45) Date of Patent: Apr. 12, 2022

(54) RADIO FREQUENCY MODULE AND COMMUNICATION DEVICE

(71) Applicant: Murata Manufacturing Co., Ltd., Nagaokakyo (JP)

(72) Inventor: Takanori Uejima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/169,584

(22) Filed: Feb. 8, 2021

(65) Prior Publication Data
US 2021/0258082 A1  Aug. 19, 2021

(30) Foreign Application Priority Data
Feb. 13, 2020 (JP) .............................. JP2020-022211

(51) Int. Cl.
*H04B 1/38* (2015.01)
*H04B 15/00* (2006.01)

(52) U.S. Cl.
CPC ............. *H04B 15/005* (2013.01); *H04B 1/38* (2013.01)

(58) Field of Classification Search
CPC ......... H04B 15/005; H04B 1/38; H01Q 1/243
USPC ................................................ 455/90.2, 90.3
See application file for complete search history.

(56) References Cited

U.S. PATENT DOCUMENTS

| | | | |
|---|---|---|---|
| 6,975,271 B2* | 12/2005 | Adachi | H01P 1/15 343/700 MS |
| 7,269,392 B2* | 9/2007 | Nakajima | H03F 1/0277 455/552.1 |
| 7,515,879 B2* | 4/2009 | Okabe | H04B 1/38 370/276 |
| 7,885,613 B2* | 2/2011 | Kemmochi | H04B 1/006 455/78 |
| 8,208,865 B2* | 6/2012 | Mikhemar | H04B 1/525 455/73 |
| 8,783,577 B2* | 7/2014 | Suzuki | H01L 23/66 235/492 |
| 9,299,914 B2* | 3/2016 | Asai | H01L 23/36 |
| 9,906,205 B2* | 2/2018 | Asai | H01L 23/3192 |
| 10,236,271 B2* | 3/2019 | Suzuki | H01L 27/105 |
| 10,243,248 B2* | 3/2019 | Puente | H04B 1/40 |
| 10,271,448 B2* | 4/2019 | Yuen | H01L 23/49541 |
| 10,439,563 B2* | 10/2019 | Takagi | H03F 3/195 |
| 10,454,426 B2* | 10/2019 | Fikstvedt | H03F 3/16 |
| 10,469,122 B2* | 11/2019 | Patel | H04B 1/48 |
| 10,615,773 B2* | 4/2020 | Vetury | H04B 1/0483 |

(Continued)

FOREIGN PATENT DOCUMENTS

JP  2015-111747 A  6/2015

*Primary Examiner* — Hai V Nguyen
(74) *Attorney, Agent, or Firm* — Xsensus LLP

(57) ABSTRACT

A radio frequency module includes: a module substrate including a first principal surface and a second principal surface opposite to each other; a first electronic component (e.g., power amplifier) disposed on the first principal surface; a second electronic component (e.g., low-noise amplifier) disposed on the second principal surface; post electrodes disposed on the second principal surface; and a plated shield wall disposed on the second principal surface and set at a ground potential. Here, the post electrodes include a first post electrode through which a first radio frequency signal is input or output, and a second post electrode through which a power-supply signal is input or output. In a plan view of the module substrate, the plated shield wall surrounds one of the first and second post electrodes, and at least part of the plated shield wall is disposed between the first and second post electrodes.

20 Claims, 9 Drawing Sheets

(56) References Cited

U.S. PATENT DOCUMENTS

| | | | |
|---|---|---|---|
| 11,139,231 B2* | 10/2021 | Honda | H01L 23/50 |
| 11,146,303 B2* | 10/2021 | Onaka | H01Q 1/48 |
| 2003/0032396 A1* | 2/2003 | Tsuchiya | H03F 1/02 |
| | | | 455/127.1 |
| 2005/0176380 A1* | 8/2005 | Okabe | H04B 1/38 |
| | | | 455/73 |
| 2007/0093229 A1* | 4/2007 | Yamakawa | H01L 25/16 |
| | | | 455/333 |
| 2009/0017772 A1* | 1/2009 | Kemmochi | H04B 1/006 |
| | | | 455/73 |
| 2011/0064004 A1* | 3/2011 | Mikhemar | H04B 1/525 |
| | | | 370/277 |
| 2011/0096705 A1* | 4/2011 | Kemmochi | H04B 1/006 |
| | | | 370/297 |
| 2014/0018126 A1* | 1/2014 | Asai | H03H 9/0571 |
| | | | 455/550.1 |
| 2014/0036471 A1* | 2/2014 | Yuen | H05K 7/02 |
| | | | 361/813 |
| 2015/0303977 A1* | 10/2015 | Puente | H04B 1/44 |
| | | | 455/78 |
| 2016/0164478 A1* | 6/2016 | Asai | H01L 27/0629 |
| | | | 330/307 |
| 2018/0205413 A1* | 7/2018 | Patel | H04B 1/18 |
| 2019/0081611 A1* | 3/2019 | Vetury | H03H 9/02015 |
| 2020/0035592 A1* | 1/2020 | Honda | H01L 23/49833 |
| 2020/0051942 A1* | 2/2020 | Nakazawa | H03F 3/245 |
| 2020/0091575 A1* | 3/2020 | Puente | H04B 1/40 |
| 2020/0203291 A1* | 6/2020 | Uejima | H03F 3/72 |
| 2020/0251459 A1* | 8/2020 | Tsuda | H01L 24/17 |
| 2021/0151874 A1* | 5/2021 | Sudo | H01Q 25/001 |
| 2021/0226652 A1* | 7/2021 | Matsumoto | H04B 1/44 |
| 2021/0258024 A1* | 8/2021 | Miyazaki | H04B 1/0067 |

* cited by examiner

FIG. 2
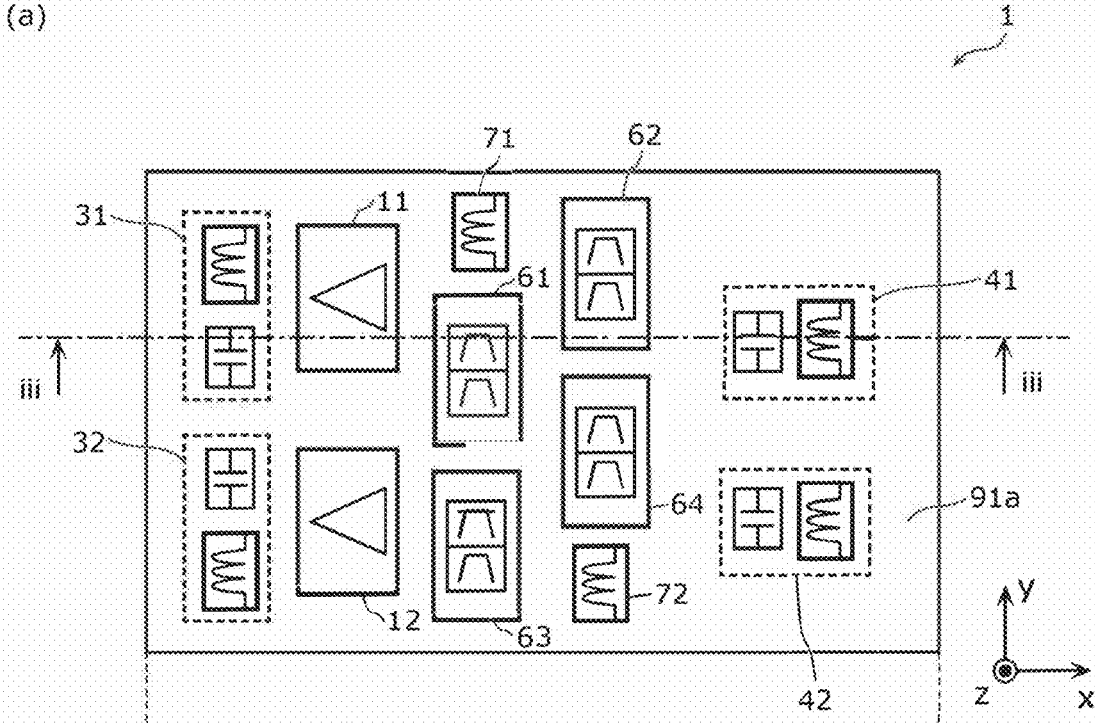
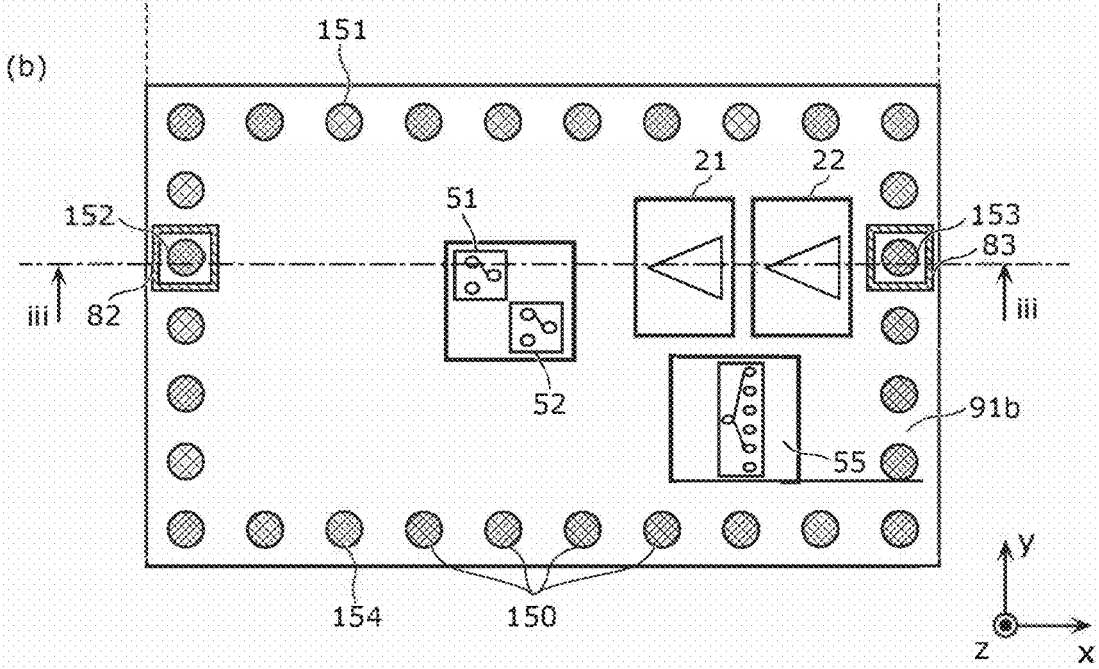

RADIO FREQUENCY MODULE AND COMMUNICATION DEVICE

CROSS REFERENCE TO RELATED APPLICATION

The present application is based on and claims priority to Japanese Patent Application No. 2020-022211 filed on Feb. 13, 2020. The entire disclosure of the above-identified application, including the specification, drawings and claims is incorporated herein by reference in its entirety.

TECHNICAL FIELD

The present disclosure relates to a radio frequency module and a communication device.

BACKGROUND

In a mobile communication device such as a mobile phone, the disposition and configuration of circuit elements of a radio frequency front-end circuit are increasingly more complex with the progress particularly in multiband communications.

Japanese Unexamined Patent Application Publication No. 2015-111747 discloses a communication module that includes a shield wall serving as a partition between a mounting region of the radio frequency processing unit and a mounting region of either or both of the system unit and the power supply circuit unit. This configuration reduces noise entry into the radio frequency processing unit from the system unit and the power supply circuit unit, thereby achieving the downsizing of the communication module.

SUMMARY

Technical Problems

However, as recognized by the present inventor, such conventional technology fails in some cases to sufficiently reduce noise entry into a radio frequency signal.

In view of the above, the present disclosure provides a radio frequency module and a communication device capable of reducing noise entry into a radio frequency signal.

Solutions

The radio frequency module according to an aspect of the present disclosure includes: a module substrate including a first principal surface and a second principal surface opposite to each other; a first electronic component disposed on the first principal surface; a second electronic component disposed on the second principal surface; a plurality of external-connection terminals disposed on the second principal surface; and a first metal wall disposed on the second principal surface and set at a ground potential. Here, the plurality of external-connection terminals include a first external-connection terminal through which a first radio frequency signal is input or output, and a second external-connection terminal through which one of a power-supply signal, a control signal, and a second radio frequency signal is input or output, in a plan view of the module substrate, the first metal wall surrounds one of the first external-connection terminal and the second external-connection terminal, and at least part of the first metal wall is disposed between the first external-connection terminal and the second external-connection terminal.

Advantageous Effects

The present disclosure is capable of reducing noise entry into a radio frequency signal.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a plan view of the radio frequency module according to Embodiment 1.

DESCRIPTION OF EMBODIMENTS

Figure 1:
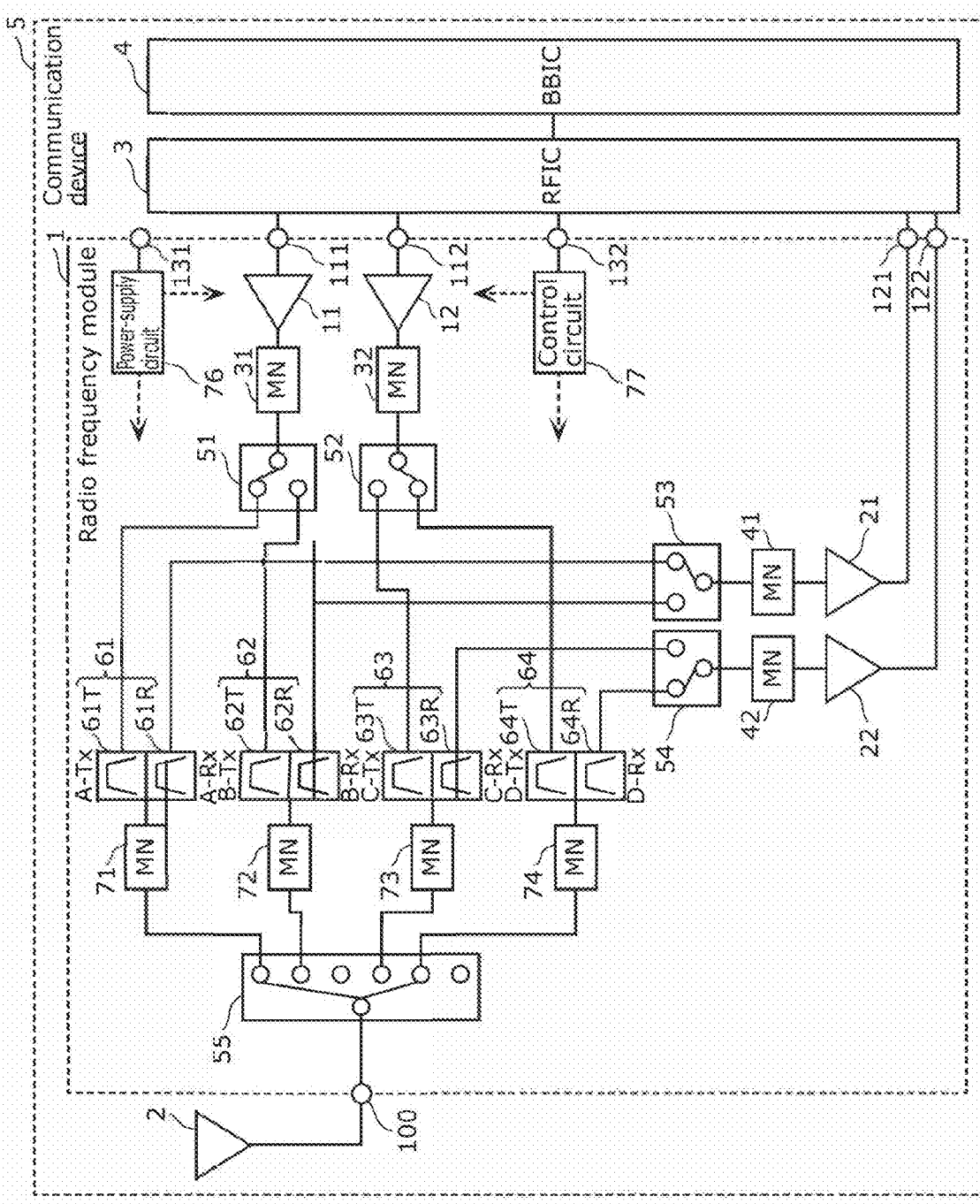
FIG. 1 is a diagram showing the circuit configurations of a radio frequency module and a communication device according to Embodiment 1.

The following describes in detail the embodiments according to the present disclosure with reference to the drawings. Note that the following embodiments show a comprehensive or specific example of the present disclosure. The numerical values, shapes, materials, structural elements, the arrangement and connection of the structural elements, etc. shown in the following embodiments are mere examples, and thus are not intended to limit the present disclosure.

Note that the drawings are schematic diagrams in which emphasis, omission, or ratio adjustment has been applied where necessary to illustrate the present disclosure. The drawings are thus not necessarily exact illustration of the present disclosure, and may illustrate shapes, positional relationships, and ratios differently from the actual ones. In the drawings, substantially the same structural elements are assigned the same reference marks, and their repetitive description may be omitted or simplified.

In the drawings, the x axis and the y axis are orthogonal to each other on a plane that is parallel to a principal surface of a module substrate. Also, the z axis is normal to a principal surface of the module substrate. The positive direction and the negative direction of the z axis indicate the upward direction and the downward direction, respectively.

In the present disclosure, a communication system means a communication system that is configured using a Radio Access Technology (RAT) defined by, for example, a standard body, etc. such as the 3rd Generation Partnership Project (3GPP) and Institute of Electrical and Electronics Engineers (IEEE). Non-limiting examples of a communication system to be used include a 5th Generation New Radio (5GNR) system, a Long Term Evolution (LTE) system, and a Wireless Local Area Network (WLAN) system.

Also, a communication band means a frequency band that is predefined by a standard body, etc. for a communication system. Non-limiting examples of a communication band to be used include a 5GNR frequency band, an LTE frequency band, and a WLAN channel.

Embodiment 1

[1.1 Circuit Configurations of Radio Frequency Module 1 and Communication Device 5]

With reference to FIG. 1, the following describes the circuit configurations of radio frequency module 1 and communication device 5 according to the present embodiment. FIG. 1 is a diagram showing the circuit configurations of radio frequency module 1 and communication device 5 according to Embodiment 1.

In the following description of the circuit configurations, "connected" means not only the case where elements are electrically connected via a wiring conductor, a terminal, a connector, a switch, or any combination of these, but also the case where elements are electrically connected via a passive element and/or an active element. Also, "connected between A and B" means that an element is disposed on a path that connects A and B and connected to both A and B.

[1.1.1 Circuit Configuration of Communication Device 5]

Communication device 5 is a device used in a communication system. Examples of communication device 5 include a smartphone and a tablet computer. As shown in FIG. 1, communication device 5 includes radio frequency module 1, antenna 2, RFIC 3, and BBIC 4.

Antenna 2 is connected to antenna connection terminal 100 of radio frequency module 1. Antenna 2 transmits a radio frequency signal outputted from radio frequency module 1. Antenna 2 also receives a radio frequency signal from outside and outputs the received radio frequency signal to radio frequency module 1.

RFIC 3 is a signal processing circuit that processes a radio frequency signal which is to be transmitted or has been received by antenna 2. More specifically, RFIC 3 performs signal processing, such as down-conversion, on a radio frequency reception signal inputted via a reception signal path of radio frequency module 1, and outputs the resulting reception signal to BBIC 4. RFIC 3 also performs signal processing, such as up-conversion, on a transmission signal inputted from BBIC 4, and outputs the resulting radio frequency transmission signal to a transmission signal path of radio frequency module 1.

RFIC 3 is also implemented as a controller that controls radio frequency module 1. More specifically, the controller transfers, to control circuit 77 of radio frequency module 1, a control signal for switching between connecting switches included in radio frequency module 1. The controller also transfers, to control circuit 77, a control signal for adjusting the gains, etc. of power amplifiers and low-noise amplifiers included in radio frequency module 1. Note that the controller may be provided outside of RFIC 3, and may thus be provided in, for example, BBIC 4.

BBIC 4 is a circuit that performs signal processing by use of an intermediate frequency band, the frequency of which is lower than that of a radio frequency signal propagating through radio frequency module 1. The signal processed by BBIC 4 is used, for example, as an image signal for image display, or as a sound signal for telephone conversation through a speaker.

Note that antenna 2 and BBIC 4 are not essential structural elements of communication device 5 according to the present embodiment.

[1.1.2 Circuit Configuration of Radio Frequency Module 1]

The following describes a detailed configuration of radio frequency module 1. As shown in FIG. 1, radio frequency module 1 includes power amplifiers 11 and 12, low-noise amplifiers 21 and 22, transmission filters 61T through 64T, reception filters 61R through 64R, matching circuits 31, 32, 41, 42, and 71 through 74, switches 51 through 55, power-supply circuit 76, and control circuit 77.

Power amplifier 11 amplifies radio frequency signals in communication band A and communication band B that belong to a first frequency band group. The input terminal of power amplifier 11 is connected to transmission input terminal 111, and the output terminal of power amplifier 11 is connected to matching circuit 31.

Power amplifier 12 amplifies radio frequency signals in communication band C and communication band D that belong to a second frequency band group. The second frequency band group is a group of frequency bands located at the lower-frequency side than the frequency bands belonging to the first frequency band group. The input terminal of power amplifier 12 is connected to transmission input terminal 112, and the output terminal of power amplifier 12 is connected to matching circuit 32.

Low-noise amplifier 21 performs low-noise amplification on radio frequency signals in communication band A and communication band B. The input terminal of low-noise amplifier 21 is connected to matching circuit 41, and the output terminal of low-noise amplifier 21 is connected to reception output terminal 121.

Low-noise amplifier 22 performs low-noise amplification on radio frequency signals in communication band C and communication band D. The input terminal of low-noise amplifier 22 is connected to matching circuit 42, and the output terminal of low-noise amplifier 22 is connected to reception output terminal 122.

Transmission filter 61T is disposed on transmission path AT that connects power amplifier 11 and antenna connection terminal 100. Transmission filter 61T passes radio frequency signals in the uplink band of communication band A among the radio frequency signals amplified by power amplifier 11.

Transmission filter 62T is disposed on transmission path BT that connects power amplifier 11 and antenna connection terminal 100. Transmission filter 62T passes radio frequency signals in the uplink band of communication band B among the radio frequency signals amplified by power amplifier 11.

Transmission filter 63T is disposed on transmission path CT that connects power amplifier 12 and antenna connection terminal 100. Transmission filter 63T passes radio frequency signals in the uplink band of communication band C among the radio frequency signals amplified by power amplifier 12.

Transmission filter 64T is disposed on transmission path DT that connects power amplifier 12 and antenna connection terminal 100. Transmission filter 64T passes radio frequency signals in the uplink band of communication band D among the radio frequency signals amplified by power amplifier 12.

Reception filter 61R is disposed on reception path AR that connects low-noise amplifier 21 and antenna connection terminal 100. Reception filter 61R passes radio frequency signals in the downlink band of communication band A among the radio frequency signals inputted from antenna connection terminal 100.

Reception filter 62R is disposed on reception path BR that connects low-noise amplifier 21 and antenna connection terminal 100. Reception filter 62R passes radio frequency signals in the downlink band of communication band B among the radio frequency signals inputted from antenna connection terminal 100.

Reception filter 63R is disposed on reception path CR that connects low-noise amplifier 22 and antenna connection terminal 100. Reception filter 63R passes radio frequency signals in the downlink band of communication band C among the radio frequency signals inputted from antenna connection terminal 100.

Reception filter 64R is disposed on reception path DR that connects low-noise amplifier 22 and antenna connection terminal 100. Reception filter 64R passes radio frequency signals in the downlink band of communication band D among the radio frequency signals inputted from antenna connection terminal 100.

Transmission filter 61T and reception filter 61R are included in duplexer 61, the passband of which is communication band A. Transmission filter 62T and reception filter 62R are included in duplexer 62, the passband of which is communication band B. Transmission filter 63T and reception filter 63R are included in duplexer 63, the passband of which is communication band C. Transmission filter 64T and reception filter 64R are included in duplexer 64, the passband of which is communication band D.

Non-limiting examples of each of these transmission filters 61T through 64T and reception filers 61R through 64R include a surface acoustic wave filter, an acoustic wave filter utilizing bulk acoustic wave (BAW), an LC resonant filter, and a dielectric filter.

Matching circuit 31 is connected between power amplifier 11 and transmission filters 61T and 62T. Matching circuit 31 matches the impedance between power amplifier 11 and transmission filters 61T and 62T.

Matching circuit 32 is connected between power amplifier 12 and transmission filters 63T and 64T. Matching circuit 32 matches the impedance between power amplifier 12 and transmission filters 63T and 64T.

Matching circuit 41 is connected between low-noise amplifier 21 and reception filters 61R and 62R. Matching circuit 41 matches the impedance between low-noise amplifier 21 and reception filters 61R and 62R.

Matching circuit 42 is connected between low-noise amplifier 22 and reception filters 63R and 64R. Matching circuit 42 matches the impedance between low-noise amplifier 22 and reception filters 63R and 64R.

Switch 51 is connected between matching circuit 31 and transmission filters 61T and 62T. Switch 51 switches between connecting power amplifier 11 and transmission filter 61T and connecting power amplifier 11 and transmission filter 62T. More specifically, switch 51 includes, for example, a common terminal connected to matching circuit 31, a first terminal connected to transmission filter 61T, and a second terminal connected to transmission filter 62T. Having such connection structure, switch 51 connects one of the first terminal and the second terminal to the common terminal on the basis of, for example, a control signal from RFIC 3. This configuration enables to switch between connecting power amplifier 11 and transmission filter 61T and connecting power amplifier 11 and transmission filter 62T. Switch 51 is implemented, for example, as a single pole double throw (SPDT) switch circuit.

Switch 52 is connected between matching circuit 32 and transmission filters 63T and 64T. Switch 52 switches between connecting power amplifier 12 and transmission filter 63T and connecting power amplifier 12 and transmission filter 64T. More specifically, switch 52 includes, for example, a common terminal connected to matching circuit 32, a first terminal connected to transmission filter 63T, and a second terminal connected to transmission filter 64T. Having such connection structure, switch 52 connects one of the first terminal and the second terminal to the common terminal on the basis of, for example, a control signal from RFIC 3. This configuration enables to switch between connecting power amplifier 12 and transmission filter 63T and connecting power amplifier 12 and transmission filter 64T. Switch 52 is implemented, for example, as an SPDT switch circuit.

Switch 53 is connected between matching circuit 41 and reception filters 61R and 62R. Switch 53 switches between connecting low-noise amplifier 21 and reception filter 61R and connecting low-noise amplifier 21 and reception filter 62R. More specifically, switch 53 includes, for example, a common terminal connected to matching circuit 41, a first terminal connected to reception filter 61R, and a second terminal connected to reception filter 62R. Having such connection structure, switch 53 connects one of the first terminal and the second terminal to the common terminal on the basis of, for example, a control signal from RFIC 3. This configuration enables to switch between connecting low-noise amplifier 21 and reception filter 61R and connecting low-noise amplifier 21 and reception filter 62R. Switch 53 is implemented, for example, as an SPDT switch circuit.

Switch 54 is connected between matching circuit 42 and reception filters 63R and 64R. Switch 54 switches between connecting low-noise amplifier 22 and reception filter 63R and connecting low-noise amplifier 22 and reception filter 64R. More specifically, switch 54 includes, for example, a common terminal connected to matching circuit 42, a first terminal connected to reception filter 63R, and a second terminal connected to reception filter 64R. Having such connection structure, switch 54 connects one of the first terminal and the second terminal to the common terminal on the basis of, for example, a control signal from RFIC 3. This configuration enables to switch between connecting low-noise amplifier 22 and reception filter 63R and connecting low-noise amplifier 22 and reception filter 64R. Switch 54 is implemented, for example, as an SPDT switch circuit.

Switch 55 is connected between antenna connection terminal 100 and transmission filters 61T through 64T, and between antenna connection terminal 100 and reception filters 61R through 64R. Switch 55 switches (1) a connection of antenna connection terminal 100 between transmission filter 61T and reception filter 61R, (2) a connection of antenna connection terminal 100 between transmission filter 62T and reception filter 62R, (3) a connection of antenna connection terminal 100 between transmission filter 63T and reception filter 63R, and (4) a connection of antenna connection terminal 100 between transmission filter 64T and reception filter 64R. Switch 55 is implemented as a multi-connection switch circuit capable of simultaneously performing two or more connections of (1) through (4).

Matching circuit 71 is connected between switch 55 and transmission filter 61T and between switch 55 and reception filter 61R. Matching circuit 71 matches the impedance between switch 55 connected to antenna 2 and transmission filter 61T and reception filter 61R.

Matching circuit 72 is connected between switch 55 and transmission filter 62T and between switch 55 and reception filter 62R. Matching circuit 72 matches the impedance between switch 55 connected to antenna 2 and transmission filter 62T and reception filter 62R.

Matching circuit 73 is connected between switch 55 and transmission filter 63T and between switch 55 and reception filter 63R. Matching circuit 73 matches the impedance between switch 55 connected to antenna 2 and transmission filter 63T and reception filter 63R.

Matching circuit 74 is connected between switch 55 and transmission filter 64T and between switch 55 and reception filter 64R. Matching circuit 74 matches the impedance between switch 55 connected to antenna 2 and transmission filter 64T and reception filter 64R.

Power-supply circuit 76 is connected to power-supply terminal 131. Upon receipt of power supplied from the power source (not illustrated) via power-supply terminal 131, power-supply circuit 76 outputs a power-supply signal to at least one of switches 51 through 55, power amplifiers 11 and 12, or low-noise amplifiers 21 and 22. Power-supply circuit 76 may output a power-supply signal to another electronic component.

The power-supply signal is a signal for supplying power to electronic components included in radio frequency module 1. For example, the power-supply signal is a signal for supplying power amplifiers 11 and 12 with a power-supply voltage and/or a bias current. The power-supply signal may also be, for example, a signal for supplying switches 51 through 55 with driving power.

Control circuit 77 is connected to control terminal 132. Upon receipt of a control signal from RFIC 3 via control terminal 132, control circuit 77 outputs a control signal to at least one of switches 51 through 55, power amplifiers 11 and 12, or low-noise amplifiers 21 and 22. Control circuit 77 may output a control signal to another electronic component.

The control signal is a signal for controlling electronic components included in radio frequency module 1. More specifically, the control signal is, for example, a digital signal for controlling at least one of power amplifiers 11 and 12, low-noise amplifiers 21 and 22, or switches 51 through 55.

In radio frequency module 1 with the above configuration, power amplifier 11, matching circuit 31, switch 51, and transmission filters 61T and 62T are included in a first transmission circuit that outputs, to antenna connection terminal 100, radio frequency transmission signals in communication band A and communication band B. Power amplifier 12, matching circuit 32, switch 52, and transmission filters 63T and 64T are included in a second transmission circuit that outputs, to antenna connection terminal 100, radio frequency signals in communication band C and communication band D. The first transmission circuit and the second transmission circuit are included in a transmission circuit that outputs, to antenna connection terminal 100, radio frequency signals in communication bands A through D.

In radio frequency module 1 with the above configuration, low-noise amplifier 21, matching circuit 41, switch 53, and reception filters 61R and 62R are included in a first reception circuit that receives radio frequency signals in communication band A and communication band B from antenna 2 via antenna connection terminal 100. Low-noise amplifier 22, matching circuit 42, switch 54, and reception filters 63R and 64R are included in a second reception circuit that receives radio frequency reception signals in communication band C and communication band D from antenna 2 via antenna connection terminal 100. The first reception circuit and the second reception circuit are included in a reception circuit that receives, from antenna connection terminal 100, radio frequency signals in communication bands A through D.

Note that the second transmission circuit and the second reception circuit are, for example, circuits for transferring radio frequency signals in communication bands that belong to a low-band group. The low-band group is a frequency band group of a plurality of communication bands for 4G and 5G. The frequency range of the low-band group is, for example, 1 GHz or lower. For example, the low-band group includes the following LTE communication bands: band B5 (uplink: 824-849 MHz, downlink: 869-894 MHz); band B8 (uplink: 880-915 MHz, downlink: 925-960 MHz); and band B28 (uplink: 703-748 MHz, downlink: 753-803 MHz).

The first transmission circuit and the first reception circuit are, for example, circuits for transferring radio frequency signals in communication bands that belong to a middle-band group. The middle-band group is a frequency band group of a plurality of communication bands for 4G and 5G. The middle-band group is a group of frequency bands located at the higher-frequency side than the frequency bands belonging to the low-band group. The middle-band group has the frequency range of, for example, 1.5-2.2 GHz.

For example, the middle-band group includes the following LTE communication bands: band B1 (uplink: 1920-1980 MHz, downlink: 2110-2170 MHz); band B39 (1880-1920 MHz); and band B66 (uplink: 1710-1780 MHz, downlink: 2110-2200 MHz).

Alternatively, the first transmission circuit and the first reception circuit may be, for example, circuits for transferring transmission signals and reception signals in communication bands that belong to a high-band group. The high-band group is a frequency band group of a plurality of communication bands for 4G and 5G. The high-band group is a group of frequency bands located at the higher-frequency side than the frequency bands belonging to the middle-band group. The high-band group has the frequency range of, for example, 2.4-2.8 GHz. For example, the high-band group includes the following LTE communication bands: band B7 (uplink: 2500-2570 MHz, downlink: 2620-2690 MHz); and band B41 (2496-2690 MHz).

With the foregoing circuit configuration, radio frequency module 1 according to the present embodiment is capable of performing at least one of simultaneous transmission, simultaneous reception, or simultaneous transmission and reception of a radio frequency signal in one of communication band A and communication band B and a radio frequency signal in one of communication band C and communication band D.

Note that the transmission circuit and the reception circuit may not be connected to antenna connection terminal 100 via switch 55. For example, the transmission circuit and the reception circuit may be connected to different antennas via different antenna connection terminals.

Also, the radio frequency module according to the present disclosure is simply required to include at least two circuit elements (e.g., power amplifier 11 and low-noise amplifier 21) without including the other circuit elements.

[1.2 Component Disposition of Radio Frequency Module 1]

Figure 3:
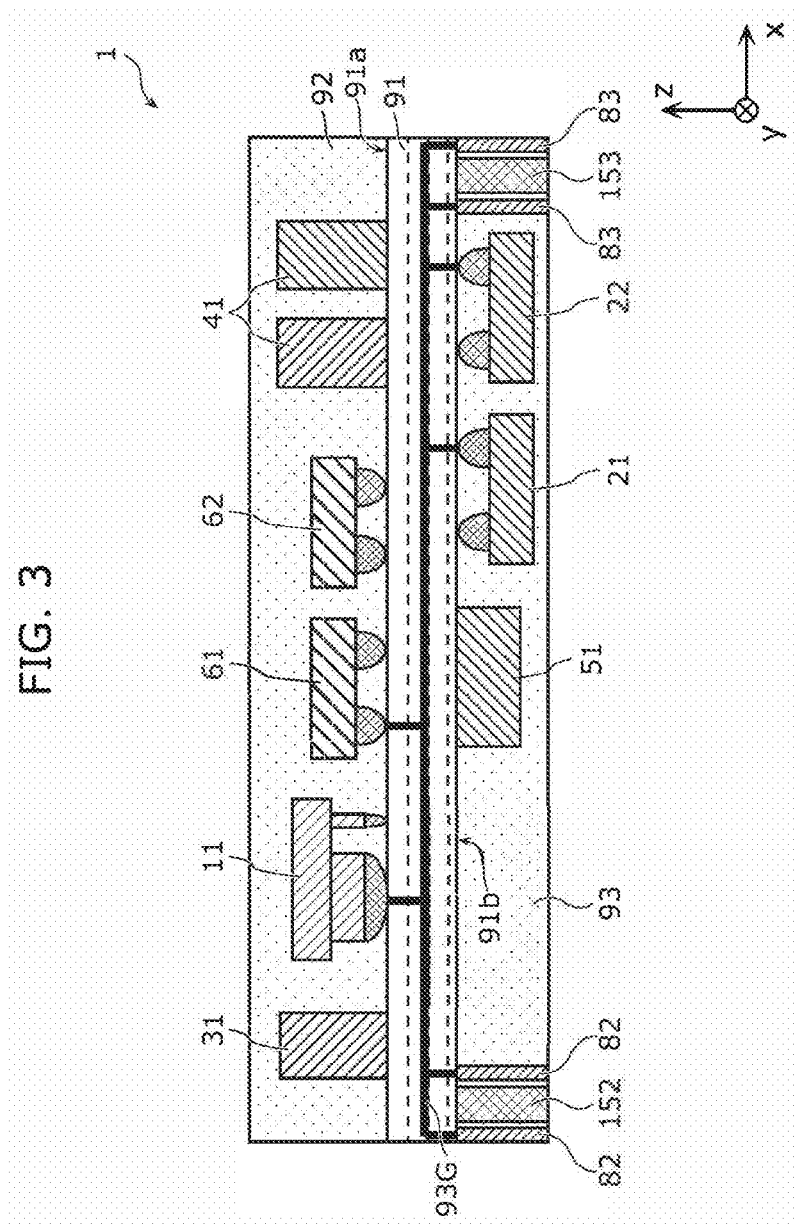
FIG. 3 is a cross-sectional view of the radio frequency module according to Embodiment 1.

With reference to FIG. 2 and FIG. 3, the following specifically describes the component disposition of radio frequency module 1 with the above configuration.

Note that in the following description of the component disposition, "in a plan view of the module substrate" means a view of an object that is orthographically projected onto the xy plane and seen from the z direction. Also, "a component is disposed on a principal surface of the module substrate" means not only the case where the component is disposed on the principal surface in contact with the principal surface of the module substrate, but also the cases where the component is disposed above the principal surface without contacting the principal surface and where the component is partially embedded in the substrate from the side of the principal surface. Also, "A is disposed between B and C" means that at least one line that connects a point in B and a point in C passes through A.

FIG. 2 is a plan view of radio frequency module 1 according to Embodiment 1. In FIG. 2, (a) is a view of principal surface 91a of module substrate 91 seen from the positive direction of the z axis, and (b) is a perspective view of principal surface 91b of module substrate 91 seen from the positive direction of the z axis. FIG. 3 is a cross-sectional view of radio frequency module 1 according to Embodiment 1. FIG. 3 shows a cross-section of radio frequency module 1 cut along iii-iii line shown in FIG. 2.

Radio frequency module 1 according to the present embodiment is packaged by resin members 92 and 93, but FIG. 2 omits the illustration of resin members 92 and 93 to illustrate the components.

As shown in FIG. 2 and FIG. 3, radio frequency module 1 further includes plated shield walls 82 and 83, module substrate 91, resin members 92 and 93, and a plurality of post electrodes 150, in addition to the electronic components that include the circuit elements shown in FIG. 1.

Module substrate 91 includes principal surfaces 91a and 91b opposite to each other. Components included in the transmission circuit and reception circuit described above are disposed on principal surfaces 91a and 91b. Non-limiting examples of module substrate 91 to be used include: a low temperature co-fired ceramics (LTCC) substrate including stacked dielectric layers; a high temperature co-fired ceramics (HTCC) substrate including stacked dielectric layers; a component-embedded substrate; a substrate having a redistribution layer (RDL); and a printed circuit board.

Principal surface 91a of module substrate 91, which is an example of the first principal surface, is also referred to as an upper surface or a surface. As shown in (a) in FIG. 2, disposed on principal surface 91a are power amplifiers 11 and 12, matching circuits 31, 32, 41, 42, 71, and 72, and duplexers 61 through 64. Each of these components on principal surface 91a is an example of the first electronic component. As shown in FIG. 3, these components are sealed by resin member 92.

Each of matching circuits 31, 32, 41, 42, 71, and 72 includes an inductor and/or a capacitor. In FIG. 2, each of matching circuits 31, 32, 41, and 42 includes both an inductor and a capacitor. Meanwhile, each of matching circuits 71 and 72 includes an inductor without including a capacitor. Matching circuits 31, 32, 41, 42, 71, and 72 are not limited to having such configuration. For example, each of matching circuits 31, 32, 41, and 42 may include no capacitor, and each of matching circuits 71 and 72 may include a capacitor.

Principal surface 91b of module substrate 91, which is an example of the second principal surface, is also referred to as a lower surface or a back surface. As shown in (b) in FIG. 2, disposed on principal surface 91b are low-noise amplifiers 21 and 22, switches 51, 52, and 55, plated shield walls 82 and 83, and a plurality of post electrodes 150. Each of these components on principal surface 91b is an example of the second electronic component. As shown in FIG. 3, these components are sealed by resin member 93.

In (b) in FIG. 2, switches 51 and 52 are included in a single component, whereas low-noise amplifiers 21 and 22, and switch 55 are included in different components. Note that low-noise amplifiers 21 and 22, and switches 51, 52, and 55 may be included in a single semiconductor integrated circuit. In this case, the semiconductor integrated circuit may have, for example, a complementary metal oxide semiconductor (CMOS) structure. More specifically, the semiconductor integrated circuit may be fabricated by a silicon on insulator (SOI) process. This enables a low-cost manufacture of the semiconductor integrated circuit. Note that the semiconductor integrated circuit may include at least one of GaAs, SiGe, or GaN. This enables to provide low-noise amplifiers having high quality amplification properties and noise characteristics.

A plurality of post electrodes 150, which is an example of a plurality of external-connection terminals, are arranged along the periphery of principal surface 91b of module substrate 91. Each of a plurality of post electrodes 150 protrudes through resin member 93 from principal surface 91b in the negative direction of the z axis. One end of each of post electrodes 150 is exposed from resin member 93 and connected to an input and output terminal and/or a ground electrode, and so forth on the mother board that is disposed at the negative side of the z axis of radio frequency module 1. A plurality of post electrodes 150 include first post electrode 151, second post electrode 152, third post electrode 153, and fourth post electrode 154.

First post electrode 151 is an example of the first external-connection terminal through which a first radio frequency signal is inputted or outputted. Stated differently, first post electrode 151 is implemented as a terminal for transferring the first radio frequency signal (e.g., antenna connection terminal 100 in FIG. 1). Note that first post electrode 151 is not limited to antenna connection terminal 100, and may thus be implemented as another terminal (e.g., transmission input terminal 111 or 112, or reception output terminal 121 or 122).

Second post electrode 152 is an example of the second external-connection terminal through which a power-supply signal is inputted. Stated differently, second post electrode 152 is implemented as a terminal for transferring a power-supply signal (e.g., power-supply terminal 131 in FIG. 1). As shown in (b) in FIG. 2, second post electrode 152 is surrounded by plated shield wall 82 in a plan view of module substrate 91.

Third post electrode 153 is an example of the second external-connection terminal or the third external-connection terminal through which a control signal is inputted. Stated differently, third post electrode 153 is implemented as a terminal for transferring a control signal (e.g., control terminal 132 in FIG. 1). As shown in (b) in FIG. 2, third post electrode 153 is surrounded by plated shield wall 83 in a plan view of module substrate 91.

Fourth post electrode 154 is an example of the second external-connection terminal through which a second radio frequency signal is inputted or outputted. Stated differently, fourth post electrode 154 is implemented as a terminal for transferring the second radio frequency signal (e.g., transmission input terminal 111 or 112, or reception output terminal 121 or 122 shown in FIG. 1).

Plated shield wall 82, which is an example of the first metal wall, is set at the ground potential. As shown in FIG. 3, plated shield wall 82 according to the present embodiment is connected, via a via conductor, to ground conductor 93G inside of module substrate 91, thereby being set at the ground potential. Plated shield wall 82 protrudes from principal surface 91b of module substrate 91 toward the negative direction of the z axis. The height of plated shield wall 82 from principal surface 91b is greater than or equal to the height of second post electrode 152 from principal surface 91b.

As shown in (b) in FIG. 2, plated shield wall 82 surrounds second post electrode 152 in a plan view of module substrate 91. Second post electrode 152 is disposed inside of plated shield wall 82 having a rectangular tubular shape, without contacting plated shield wall 82. With this configuration, one part of plated shield wall 82 is disposed between first post electrode 151 and second post electrode 152. Also, another part of plated shield wall 82 is disposed between second post electrode 152 and fourth post electrode 154.

Plated shield wall 83, which is an example of the second metal wall, is set at the ground potential. As shown in FIG. 3, plated shield wall 83 according to the present embodiment is connected, via a via conductor, to ground conductor 93G inside of module substrate 91, thereby being set at the ground potential. Plated shield wall 83 protrudes from principal surface 91b of module substrate 91 toward the negative direction of the z axis. The height of plated shield wall 83 from principal surface 91b is greater than or equal to the height of third post electrode 153 from principal surface 91b.

As shown in (b) in FIG. 2, plated shield wall 83 surrounds third post electrode 153 in a plan view of module substrate 91. Third post electrode 153 is disposed inside of plated shield wall 83 having a rectangular tubular shape, without contacting plated shield wall 83. With this configuration, one part of plated shield wall 83 is disposed between first post electrode 151 and third post electrode 153. Also, another part of plated shield wall 83 is disposed between third post electrode 153 and fourth post electrode 154.

Note that in an example shown in FIG. 2 and FIG. 3, both second post electrode 152 and third post electrode 153 are individually surrounded by plated shield wall 82 and plated shield wall 83, respectively, but the present disclosure is not limited to this configuration. For example, only one of second post electrode 152 and third post electrode 153 may be surrounded by plated shield wall 82 or 83. Alternatively, both second post electrode 152 and third post electrode 153 may be surrounded by a single plated shield wall.

In the present embodiment, a plurality of post electrodes 150 and plated shield walls 82 and 83 comprise plated metal. Stated differently, a plurality of post electrodes 150 and plated shield walls 82 and 83 are metal objects grown by plating. A plurality of post electrodes 150 and plated shield walls 82 and 83 are formed, for example, through the processes described below.

First, concave portions are formed on a predetermined region on principal surface 91b of module substrate 91 by, for example, photo-sensitive resist to expose a seed layer serving as the base of plating. Subsequently, metal such as gold and copper is grown on the exposed seed layer by electric field plating to simultaneously form a plurality of post electrodes 150 and plated shield walls 82 and 83.

Although not illustrated in FIG. 2 and FIG. 3, switches 53 and 54, matching circuits 73 and 74, power-supply circuit 76, and control circuit 77 may be disposed on either principal surface 91a or 91b of module substrate 91, or inside of module substrate 91.

Also note that the radio frequency module according to the present disclosure is simply required to include at least module substrate 91, any one of the electronic components disposed on principal surface 91a of module substrate 91 (e.g., power amplifier 11), any one of the electronic components disposed on principal surface 91b of module substrate 91 (e.g., low-noise amplifier 21), a plurality of post electrodes 150, and plated shield wall 82 or 83, without including the other components.

[1.3 Effects, etc.]

As described above, radio frequency module 1 according to the present embodiment includes: module substrate 91 including principal surface 91a and principal surface 91b opposite to each other; a first electronic component (e.g., power amplifier 11 or 12) disposed on principal surface 91a; a second electronic component (e.g., low-noise amplifier 21 or 22) disposed on principal surface 91b; a plurality of post electrodes 150 disposed on principal surface 91b; and plated shield wall 82 disposed on principal surface 91b and set at a ground potential. Here, a plurality of post electrodes 150 include first post electrode 151 through which a first radio frequency signal is inputted or outputted, and second post electrode 152 through which a power-supply signal is inputted. In a plan view of module substrate 91, plated shield wall 82 surrounds one of first post electrode 151 and second post electrode 152, and at least part of plated shield wall 82 is disposed between first post electrode 151 and second post electrode 152.

This configuration, in which the first electronic component and the second electronic component are disposed on both surfaces of module substrate 91, achieves the downsizing of radio frequency module 1. Also, this configuration, in which plated shield wall 82 separates first post electrode 151 and second post electrode 152 from each other, inhibits a power-supply signal transferred by second post electrode 152 from entering, as noise, the first radio frequency signal transferred by first post electrode 151. Stated differently, the above configuration reduces noise entry into a radio frequency signal that flows through the external-connection terminals in radio frequency module 1 including a double-sided mounting substrate, thereby improving the electrical characteristics (e.g., noise figure (NF) characteristics) of radio frequency module 1.

Also, for example, in radio frequency module 1 according to the present embodiment, plated shield wall 82 may be at least partially plated with metal.

With this configuration, plated shield wall 82 is formed by plating, thereby reducing thermal load on radio frequency module 1 compared to the case where spattering, for example, is used. Consequently, the present configuration is capable of reducing changes in the characteristics of electronic components and deformation of module substrate 91 caused by heat. Also, the present configuration enables the use of relatively high-density plated metal for walls, thereby further reducing noise entry from second post electrode 152 into first post electrode 151.

Also, for example, in radio frequency module 1 according to the present embodiment, a plurality of post electrodes 150 may comprise plating metal.

With this configuration, plated shield wall 82 is formed by the same process as that of a plurality of post electrodes 150, thereby simplifying the manufacture processes of radio frequency module 1.

Also, for example, in radio frequency module 1 according to the present embodiment, the height of plated shied wall 82 from principal surface 91b may be greater than or equal to the height of second post electrode 152 from principal surface 91b.

This configuration, in which second post electrode 152 is surrounded by plated shield wall 82 excluding the both ends of second post electrode 152, improves the shielding effect of plated shield wall 82.

Also, for example, radio frequency module 1 according to the present embodiment may further include plated shield wall 83 disposed on principal surface 91b and set at the ground potential. In this case, a plurality of post electrodes 150 may further include third post electrode 153 through which the control signal is inputted. In a plan view of module substrate 91, plated shield wall 83 may surround third post electrode 153, and at least part of plated shield wall 83 may be disposed between first post electrode 151 and third post electrode 153.

This configuration inhibits a control signal transferred by third post electrode 153 from entering, as noise, the first radio frequency signal transferred by first post elect rode 151. Stated differently, this configuration reduces interference between a signal that flows through first post electrode 151 and a signal that flows through third post electrode 153. The present configuration reduces the entry of digital noise to the first radio frequency signal, particularly in the case where the control signal is a digital signal, thereby further improving the electrical characteristics of radio frequency module 1.

Also, for example, in radio frequency module 1 according to the present embodiment, the first electronic component may include power amplifier 11, and the second electronic component may include low-noise amplifier 21.

This configuration, in which power amplifier 11 and low-noise amplifier 21 are disposed on the opposite sides of module substrate 91, achieves the downsizing of radio frequency module 1 and improves the isolation characteristics between power amplifier 11 and low-noise amplifier 21.

Communication device 5 according to the present embodiment includes RFIC 3 that processes a radio frequency signal, and radio frequency module 1 that transfers the radio frequency signal processed by RFIC 3.

This configuration enables communication device 5 to achieve the same effects as those achieved by radio frequency module 1.

Embodiment 2

The following describes Embodiment 2. The present embodiment is different from Embodiment 1 described above mainly in that the first post electrode through which a radio frequency signal is inputted or outputted is surrounded by a plated shield wall. With reference to the drawings, the following focuses on the difference from Embodiment 1 to describe the present embodiment.

[2.1 Component Disposition of Radio Frequency Module 1A]

The circuit configuration of radio frequency module 1A according to the present embodiment is the same as that according to Embodiment 1, and thus the illustration and description thereof will be omitted. The following specifically describes the component disposition of radio frequency module 1A with reference to FIG. 4.

Figure 4:
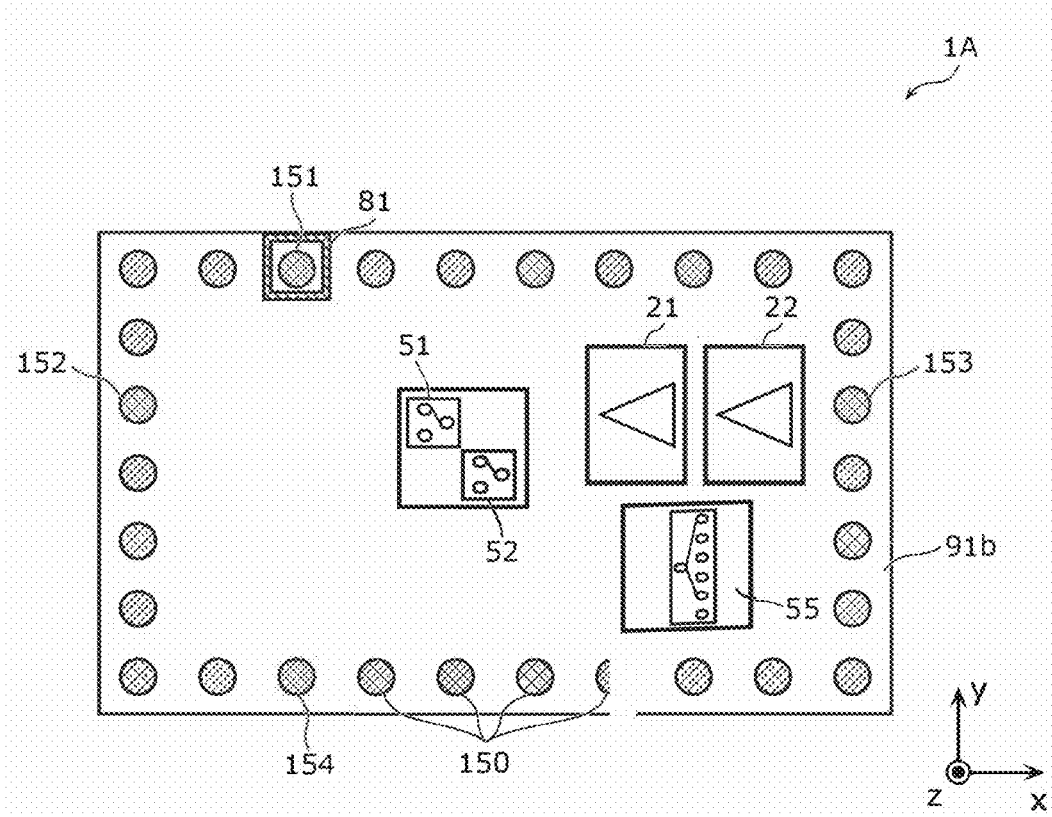
FIG. 4 is a plan view of a radio frequency module according to Embodiment 2.

FIG. 4 is a plan view of radio frequency module 1A according to Embodiment 2. More specifically, FIG. 4 is a perspective view of principal surface 91b of module substrate 91 seen from the positive direction of the z axis. Note that FIG. 4 also omits the illustration of resin member 93 as with Embodiment 1 described above.

As shown in FIG. 4, radio frequency module 1A according to the present embodiment includes plated shield wall 81 instead of plated shield walls 82 and 83.

Plated shield wall 81 is an example of the first metal wall that is set at the ground potential. In a plan view of module substrate 91, plated shield wall 81 surrounds first post electrode 151. The height of plated shield wall 81 from principal surface 91b is greater than or equal to the height of first post electrode 151 from principal surface 91b. As a result, plated shield wall 81 is disposed between first post electrode 151 and another post electrode (e.g., second post electrode 152, third post electrode 153, fourth post electrode 154, etc.).

[2.2 Effect, etc.]

As described above, in radio frequency module 1A according to the present embodiment, first post electrode 151 may be surrounded by plated shield wall 81 in a plan view of module substrate 91.

This configuration, in which first post electrode 151 through which the first radio frequency signal is inputted or outputted is surrounded by plated shield wall 81, reduces noise entry to first post electrode 151 from another post electrode (e.g., second post electrode 152 and third post electrode 153). This configuration also reduces noise entry to first post electrode 151 from elements other than post electrodes, thereby improving the electrical characteristics of radio frequency module 1.

Embodiment 3

The following describes Embodiment 3. The present embodiment is different from Embodiment 1 described above mainly in that the radio frequency module includes a shield film. With reference to the drawings, the following focuses on the difference from Embodiment 1 to describe the present embodiment.

[3.1 Component Disposition of Radio Frequency Module 1B]

The circuit configuration of radio frequency module 1B according to the present embodiment is the same as that according to Embodiment 1, and thus the illustration and description thereof will be omitted. The following specifically describes the component disposition of radio frequency module 1B with reference to FIG. 5 and FIG. 6.

Figure 5:
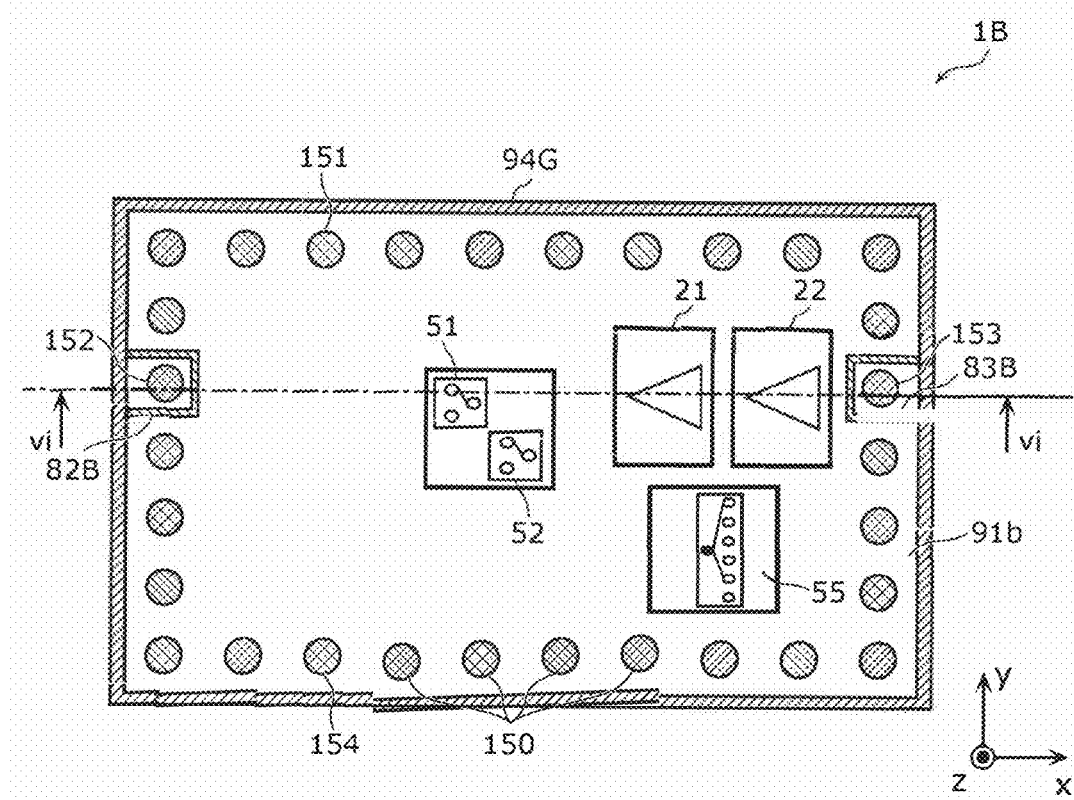
FIG. 5 is a plan view of a radio frequency module according to Embodiment 3.
Figure 6:
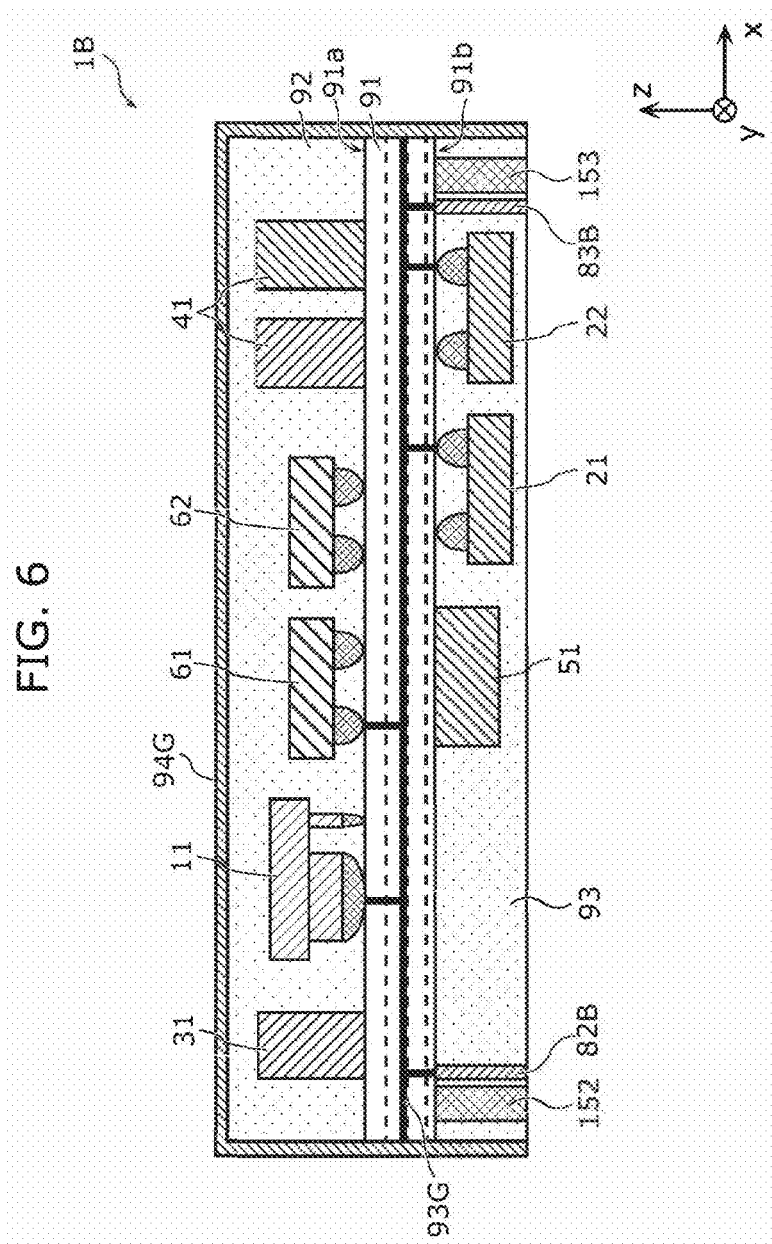
FIG. 6 is a cross-sectional view of the radio frequency module according to Embodiment 3.

FIG. 5 is a plan view of radio frequency module 1B according to Embodiment 3. More specifically, FIG. 5 is a perspective view of principal surface 91b of module substrate 91 seen from the positive direction of the z axis. Note that FIG. 5 also omits the illustration of resin member 93 as with Embodiment 1 described above. FIG. 6 is a cross-sectional view of radio frequency module 1B according to Embodiment 3. FIG. 6 shows a cross-section of radio frequency module 1B cut along vi-vi line shown in FIG. 5.

As shown in FIG. 5 and FIG. 6, radio frequency module 1B according to the present embodiment includes plated shield walls 82B and 83B instead of plated shield walls 82 and 83, and further includes shield film 94G.

Shield film 94G is a metal thin film formed, for example, by spattering. Shield film 94G covers principal surface 91a and side surfaces of module substrate 91. For example, shield film 94G at the side surfaces of module substrate 91 is connected to ground conductor 93G.

As shown in FIG. 5, second post electrode 152 is surrounded by shield film 94G and plated shield wall 82B in a plan view of module substrate 91. Also, third post electrode 153 is surrounded by shield film 94G and plated shield wall 83B in a plan view of module substrate 91. Stated differently, shield film 94G comprises a part of the first metal wall that surrounds second post electrode 152, and a part of the second metal wall that surrounds third post electrode 153.

[3.2 Effect, etc.]

As described above, radio frequency module 1B according to the present embodiment may further include shield film 94G that covers principal surface 91a and side surfaces of module substrate 91. Also, shield film 94G may comprise a part of the first metal wall.

This configuration, in which shield film 94G comprises a part of the metal wall, achieves the same effects as those achieved by Embodiment 1.

Embodiment 4

The following describes Embodiment 4. The present embodiment is different from Embodiment 1 described above mainly in that each plated shield wall surrounds a plurality of post electrodes. With reference to the drawings, the following focuses on the difference from Embodiment 1 to describe the present embodiment.

[4.1 Component Disposition of Radio Frequency Module 1C]

The circuit configuration of radio frequency module 1C according to the present embodiment is the same as that according to Embodiment 1, and thus the illustration and description thereof will be omitted. The following specifically describes the component disposition of radio frequency module 1C with reference to FIG. 7.

Figure 7:
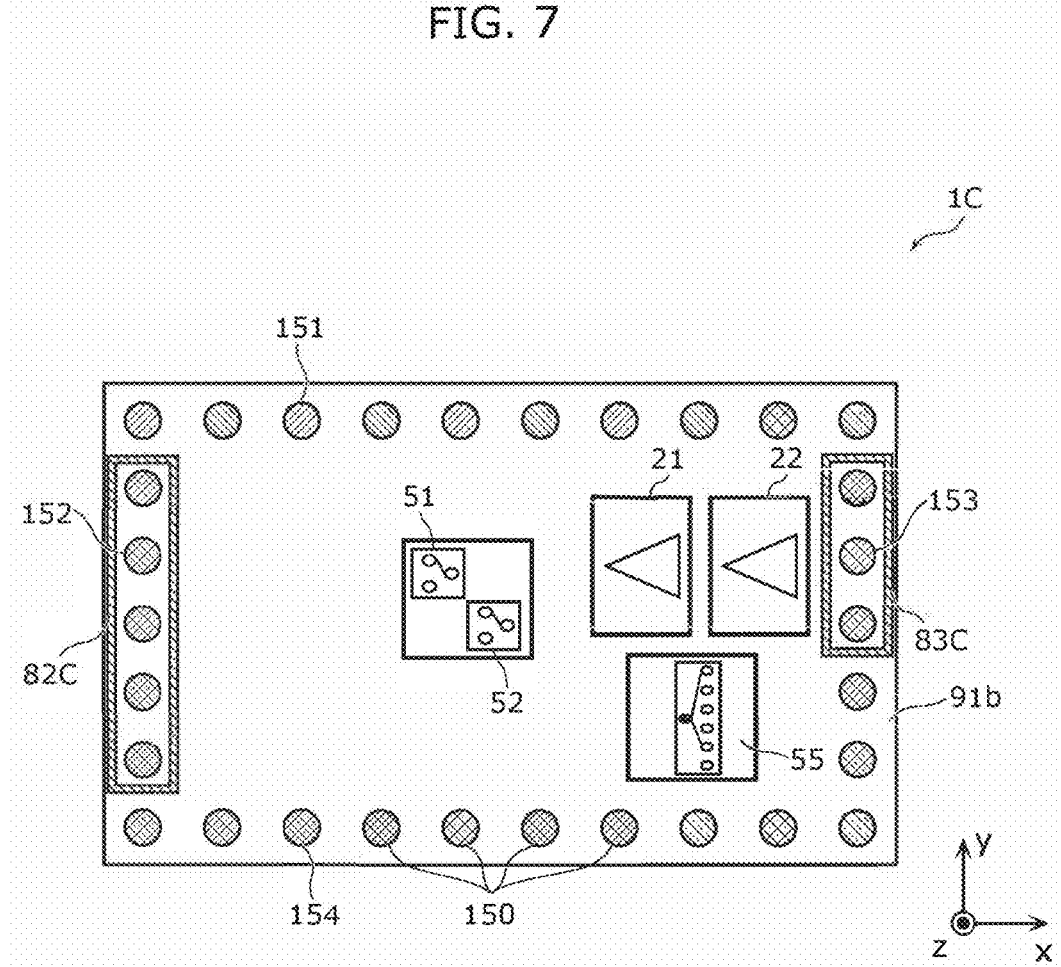
FIG. 7 is a plan view of a radio frequency module according to Embodiment 4.

FIG. 7 is a plan view of radio frequency module 1C according to Embodiment 4. More specifically, FIG. 7 is a perspective view of principal surface 91b of module substrate 91 seen from the positive direction of the z axis. Note that FIG. 7 also omits the illustration of resin member 93 as with Embodiment 1 described above.

As shown in FIG. 7, radio frequency module 1C according to the present embodiment includes plated shield walls 82C and 83C instead of plated shield walls 82 and 83.

Plated shield wall 82C is an example of the first metal wall. In a plan view of module substrate 91, plated shield wall 82C surrounds five post electrodes 150 including second post electrode 152. The five post electrodes 150 may include, for example, the ground electrode and/or another input and output electrode for power-supply signal, without including first post electrode 151. Plated shield wall 82C is disposed between first post electrode 151 and second post electrode 152.

Plated shield wall 83C is an example of the second metal wall. In a plan view of module substrate 91, plated shield wall 83C surrounds three post electrodes 150 including third post electrode 153. The three post electrodes 150 is simply required not to include first post electrode 151, and may include, for example, the ground electrode and/or another input and output electrode for a control signal. Plated shield wall 83C is disposed between first post electrode 151 and third post electrode 153.

[4.2 Effect, etc.]

As described above, in radio frequency module 1C according to the present embodiment, one or more of a plurality of post electrodes 150 are surrounded by plated shield wall 82C and include only one of first post electrode 151 and second post electrode 152 without including the other.

Also, in radio frequency module 1C according to the present embodiment, for example, one or more of a plurality of post electrodes 150 are surrounded by plated shield wall 83C and include only one of first post electrode 151 and third post electrode 153 without including the other.

Radio frequency module 1C with the above configuration also achieves the same effects as those achieved by Embodiment 1.

Embodiment 5

The following describes Embodiment 5. The present embodiment is different from Embodiment 1 described above mainly in that the radio frequency module includes a plurality of bump electrodes instead of a plurality of post electrodes. With reference to the drawings, the following focuses on the difference from Embodiment 1 to describe the present embodiment.

[5.1 Component Disposition of Radio Frequency Module 1D]

The circuit configuration of radio frequency module 1D according to the present embodiment is the same as that according to Embodiment 1, and thus the illustration and description thereof will be omitted. The following specifically describes the component disposition of radio frequency module 1D with reference to FIG. 8 and FIG. 9.

Figure 8:
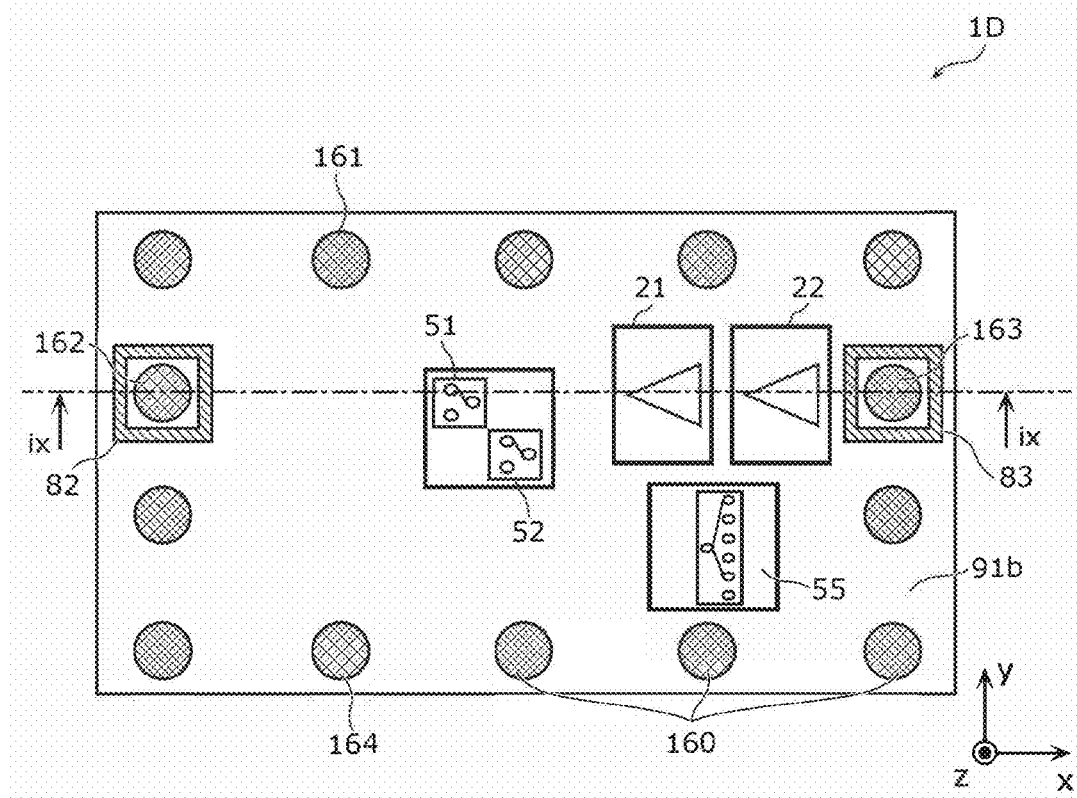
FIG. 8 is a plan view of a radio frequency module according to Embodiment 5.
Figure 9:
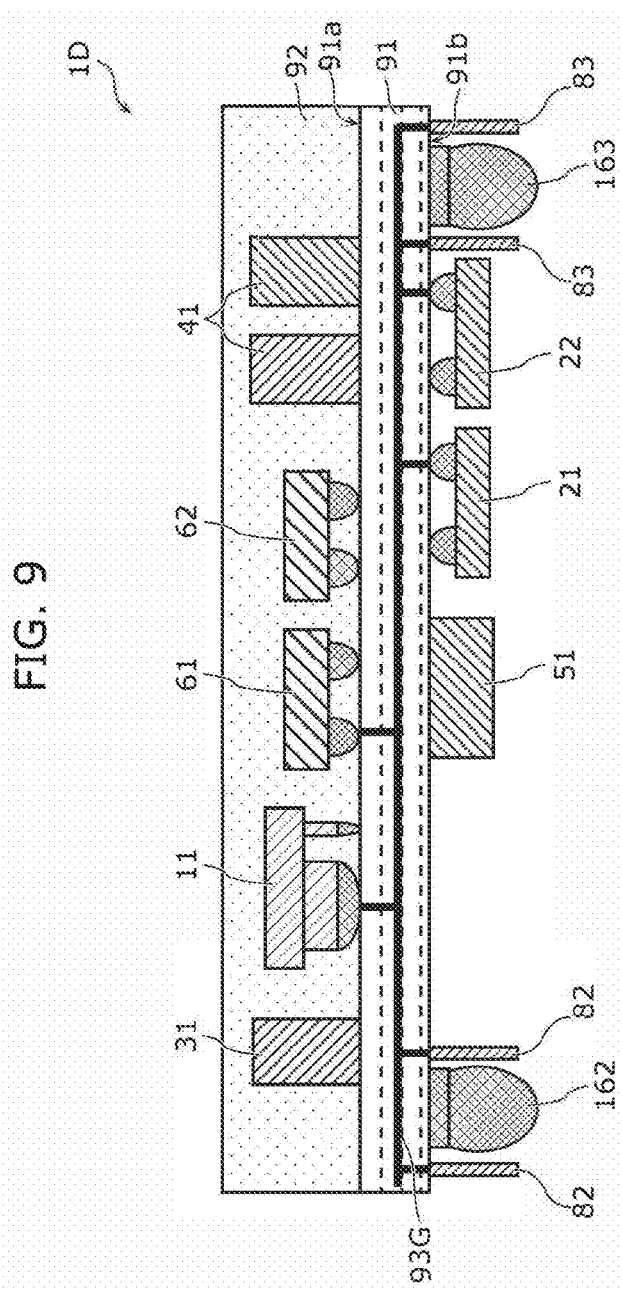
FIG. 9 is a cross-sectional view of the radio frequency module according to Embodiment 5.

FIG. 8 is a plan view of radio frequency module 1D according to Embodiment 5. More specifically, FIG. 8 is a perspective view of principal surface 91b of module substrate 91 seen from the positive direction of the z axis. FIG. 9 is a cross-sectional view of radio frequency module 1D according to Embodiment 5. FIG. 9 shows a cross-section of radio frequency module 1D cut along ix-ix line shown in FIG. 8.

As shown in FIG. 8 and FIG. 9, radio frequency module 1D according to the present embodiment includes a plurality of bump electrodes 160 including first bump electrode 161 through fourth bump electrode 164, instead of a plurality of post electrodes 150 including first post electrode 151 through fourth post electrode 154. Radio frequency module 1D according to the present embodiment may not include resin member 93 at the side of principal surface 91b.

[5.2 Effect, etc.]

As described above, radio frequency module 1D according to the present embodiment may include a plurality of bump electrodes 160 as a plurality of external-connection terminals.

Radio frequency module 1D with the above configuration also achieves the same effects as those achieved by Embodiment 1.

Another Embodiment

The radio frequency module and the communication device according to the present disclosure have been described above, using the embodiments, but the radio frequency module and the communication device according to the present disclosure are not limited to such embodiments. The present disclosure also includes: another embodiment achieved by freely combining structural elements in the embodiments; variations achieved by making various modifications to the embodiments that can be conceived by those skilled in the art without departing from the essence of the present disclosure; and various devices that include the radio frequency module and the communication device described above.

For example, in the circuit configurations of the radio frequency module and the communication device according to the embodiments, another circuit element, wiring, and so forth may be present in a path that connects each circuit element and a signal path disclosed in the drawings.

Also, Embodiment 1 and Embodiment 2 described above may be combined. In this case, each of first post electrode 151, second post electrode 152, and third post electrode 153 is surrounded by a plated shield wall. Also, Embodiment 2 may be combined with one of Embodiment 3, 4, and 5 described above. The combination of embodiments is not limited to the foregoing combination, and thus Embodiments 1 through 5 can be freely combined.

Note that the plated shield walls in the foregoing embodiments are connected to the ground conductor inside of the module substrate, but the present disclosure is not limited to this configuration. The plated shield walls may be connected, for example, to the ground conductor on the mother board that is disposed at the negative side of the z axis of the module substrate.

Also, the shape of the plated shield walls is not limited to the one described in the foregoing embodiments. The plated shield walls may have a curved surface, and thus may have, for example, a tubular shape or an oval shape.

Also note that the metal walls in the foregoing embodiments are at least partially plated with metal, but the present disclosure is not limited to this. The metal walls may be formed by, for example, applying metal paste. The metal walls may also be formed by connecting a preliminary molded metal member onto principal surface 91b of module substrate 91.

Note that first post electrode 151 or second post electrode 152 and third post electrode 153 are surrounded by plated shield walls in Embodiments 1 through 4, but the present disclosure is not limited to this configuration. For example, each of first post electrode 151 through third post electrode 153 may be surrounded by a plated shield wall. Further, fourth post electrode 154 may be surrounded by a plated shield wall. Stated differently, any one of or any combination of first post electrode 151 through fourth post electrode 154 may be surrounded by plated shield walls.

Note that the radio frequency module according to each of the foregoing embodiments includes one control terminal and one power-supply terminal, but the number of control terminals and power-supply terminals is not limited to one. For example, the radio frequency module may include a control terminal and a power-supply terminal for each component that receives a control signal and a power-supply signal. In this case, the radio frequency module may include no control circuit nor power-supply circuit.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable for use in a communication device (e.g., mobile phone) as a radio frequency module that is placed at the front-end portion.

The invention claimed is:

1. A radio frequency module, comprising:
a module substrate including a first principal surface and a second principal surface opposite to each other;
a first electronic component disposed on the first principal surface;
a second electronic component disposed on the second principal surface;
a plurality of external-connection terminals disposed on the second principal surface; and
a first metal wall disposed on the second principal surface and set at a ground potential, wherein
the plurality of external-connection terminals include a first external-connection terminal through which a first radio frequency signal is input or output, and a second external-connection terminal through which one of a power-supply signal, a control signal, and a second radio frequency signal is input or output,
in a plan view of the module substrate, the first metal wall surrounds one of the first external-connection terminal and the second external-connection terminal, and
at least part of the first metal wall is disposed between the first external-connection terminal and the second external-connection terminal.

2. The radio frequency module of claim 1, wherein
the first metal wall is at least partially plated with metal.

3. The radio frequency module of claim 2, wherein
the plurality of external-connection terminals comprise plating metal.

4. The radio frequency module of claim 1, wherein
a height of the first metal wall from the second principal surface is greater than or equal to a height of the one of the first external-connection terminal and the second external-connection terminal from the second principal surface.

5. The radio frequency module of claim 1, wherein
in the plan view of the module substrate, the first metal wall surrounds the second external-connection terminal.

6. The radio frequency module of claim 1, further comprising:
a second metal wall disposed on the second principal surface and set at the ground potential.

7. The radio frequency module of claim 1, wherein
the second external-connection terminal is a terminal through which the power-supply signal is input.

8. The radio frequency module of claim 6, wherein
the second external-connection terminal is a terminal through which the power-supply signal is input, and
the plurality of external-connection terminals further include a third external-connection terminal through which the control signal is input.

9. The radio frequency module of claim 8, wherein
in the plan view of the module substrate, the second metal wall surrounds the third external-connection terminal, and
at least part of the second metal wall is disposed between the first external-connection terminal and the third external-connection terminal.

10. The radio frequency module of claim 1, wherein
in the plan view of the module substrate, the first metal wall surrounds the first external-connection terminal.

11. The radio frequency module of claim 1, further comprising:
a shield film covering the first principal surface and a side surface of the module substrate, wherein
the shield film comprises part of the first metal wall.

12. The radio frequency module of claim 1, wherein
the first electronic component includes a power amplifier, and
the second electronic component includes a low-noise amplifier.

13. A radio frequency module, comprising:
a module substrate including a first principal surface and a second principal surface opposite to each other;
a first electronic component disposed on the first principal surface;
a second electronic component disposed on the second principal surface;
a first external-connection terminal disposed on the second principal surface and through which a first radio frequency signal is input or output;
a second external-connection terminal disposed on the second principal surface and through which one of a power-supply signal, a control signal, and a second radio frequency signal is input or output; and a first metal wall disposed on the second principal surface and set at a ground potential, wherein the first metal wall surrounds one of the first external-connection terminal and the second external-connection terminal in a plan view of the module substrate.

14. The radio frequency module of claim 13, wherein at least part of the first metal wall is disposed between the first external-connection terminal and the second external-connection terminal.

15. The radio frequency module of claim 13, wherein a height of the first metal wall from the second principal surface is greater than or equal to a height of the one of the first external-connection terminal and the second external-connection terminal from the second principal surface.

16. The radio frequency module of claim 13, wherein in the plan view of the module substrate, the first metal wall surrounds the second external-connection terminal.

17. The radio frequency module of claim 13, further comprising:
a second metal wall disposed on the second principal surface and set at the ground potential; and
a third external-connection terminal disposed on the second principal surface and through which the control signal is input, wherein
the second external-connection terminal is a terminal through which the power-supply signal is input,
in the plan view of the module substrate, the second metal wall surrounds the third external-connection terminal, and
at least part of the second metal wall is disposed between the first external-connection terminal and the third external-connection terminal.

18. The radio frequency module of claim 13, wherein in the plan view of the module substrate, the first metal wall surrounds the first external-connection terminal.

19. The radio frequency module of claim 13, further comprising:
a shield film covering the first principal surface and a side surface of the module substrate, wherein
the shield film comprises part of the first metal wall.

20. A communication device, comprising:
a signal processing circuit configured to process a radio frequency signal; and
the radio frequency module configured to transfer the radio frequency signal processed by the signal processing circuit, wherein
the radio frequency module includes
a module substrate including a first principal surface and a second principal surface opposite to each other;
a first electronic component disposed on the first principal surface;
a second electronic component disposed on the second principal surface;
a plurality of external-connection terminals disposed on the second principal surface; and
a first metal wall disposed on the second principal surface and set at a ground potential, wherein
the plurality of external-connection terminals include a first external-connection terminal through which a first radio frequency signal is input or output, and a second external-connection terminal through which one of a power-supply signal, a control signal, and a second radio frequency signal is input or output,
in a plan view of the module substrate, the first metal wall surrounds one of the first external-connection terminal and the second external-connection terminal, and
at least part of the first metal wall is disposed between the first external-connection terminal and the second external-connection terminal.

* * * * *